(12) United States Patent
Sorensen et al.

(10) Patent No.: US 6,499,437 B1
(45) Date of Patent: Dec. 31, 2002

(54) MAGNETIC CONNECTOR

(75) Inventors: Joseph A. Sorensen, 1079 Summer Ridge Rd., Bozeman, MT (US) 59715; Derek Gustafson, Bozeman, MT (US); Tom Jungst, Bozeman, MT (US)

(73) Assignee: Joseph A. Sorensen, Bozeman, MT (US)

( * ) Notice: Subject to any disclaimer, the term of this patent is extended or adjusted under 35 U.S.C. 154(b) by 0 days.

(21) Appl. No.: 09/930,068

(22) Filed: Aug. 15, 2001

(51) Int. Cl.⁷ .......................... A01K 27/00; A44B 21/00
(52) U.S. Cl. ..................... 119/792; 119/769; 119/856; 119/863; 24/303
(58) Field of Search .................. 119/742, 756, 119/760, 865, 792, 863, 856, 776; 24/303

(56) References Cited

U.S. PATENT DOCUMENTS

| | | | |
|---|---|---|---|
| 3,009,225 A | | 11/1961 | Budreck |
| 3,041,697 A | | 7/1962 | Budreck |
| 3,086,268 A | | 4/1963 | Chaffin |
| 3,293,714 A | * | 12/1966 | Shafer .......................... 24/303 |
| 3,589,341 A | | 6/1971 | Krebs |
| 4,941,235 A | * | 7/1990 | Aoki ............................ 24/303 |
| 4,989,299 A | * | 2/1991 | Morita .......................... 24/303 |
| 5,432,986 A | * | 7/1995 | Sexton .......................... 24/303 |
| 5,572,887 A | | 11/1996 | Geswelli |
| 6,003,474 A | | 12/1999 | Slater |
| 6,205,956 B1 | * | 3/2001 | Dickie et al. ............... 119/792 |
| 6,292,985 B1 | * | 9/2001 | Grunberger ................. 24/303 |

* cited by examiner

*Primary Examiner*—Charles T. Jordan
*Assistant Examiner*—Tara M Golba
(74) *Attorney, Agent, or Firm*—Brinks, Hofer, Gilson & Lione

(57) ABSTRACT

A magnetic connector includes first and second connector parts, each having a respective magnet. The second connector part includes an overhanging lip positioned on one side of the respective magnet and a cord loop positioned on the opposite side of the respective magnet. The first and second magnets are oriented to automatically hold the first and second connector parts together, with the first connector part disposed in a first position between the overhanging lip and the cord loop. The overhanging lip is positioned such that a tensile force applied to the first connector part and resisted by the cord loop translates the first connector part from the first position to a second position, in which the first magnet is closer to the overhanging lip and the first connector part is at least partially received under the overhanging lip, thereby mechanically interlocking the first and second connector parts.

22 Claims, 3 Drawing Sheets

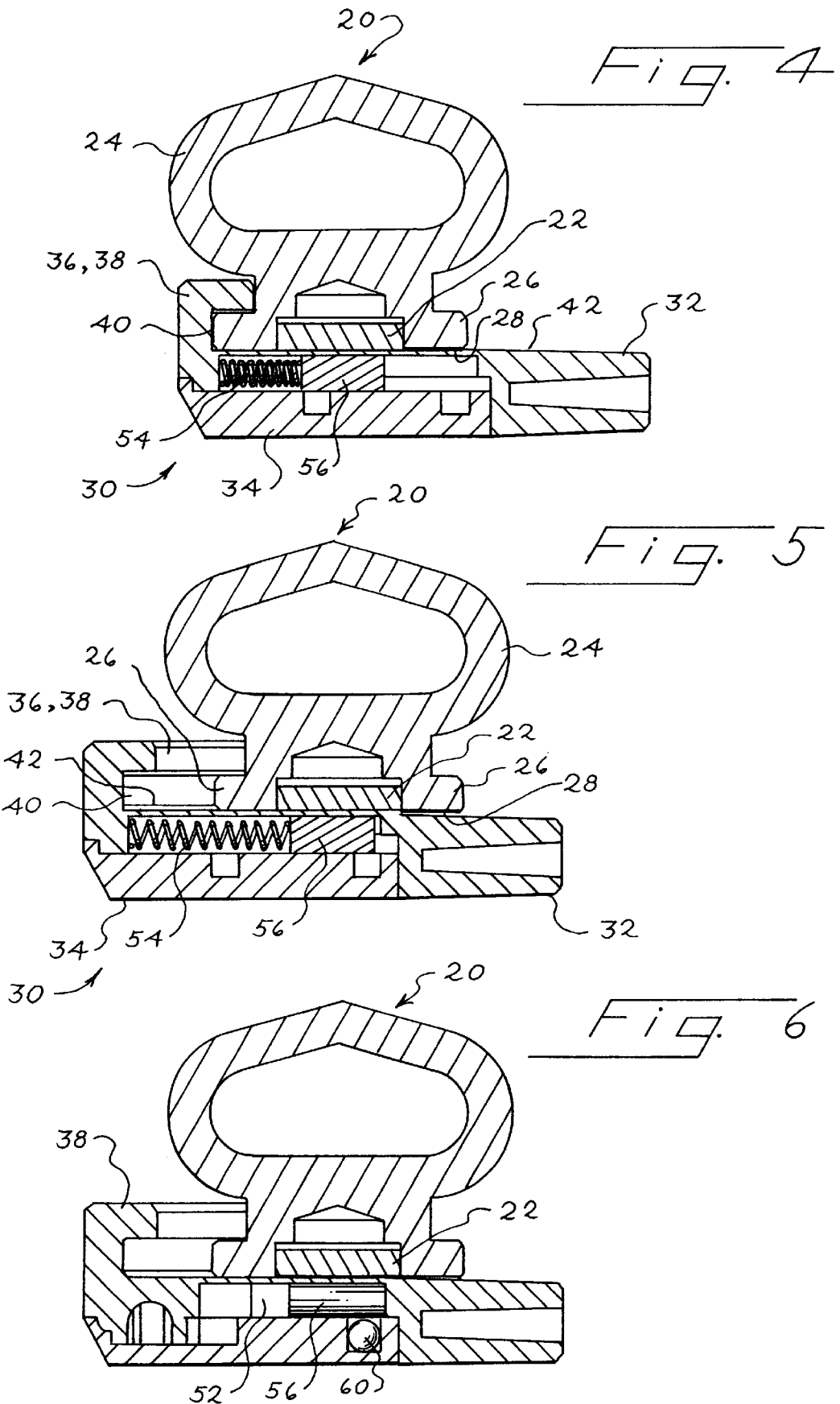

MAGNETIC CONNECTOR

BACKGROUND

The present invention relates to magnetic connectors, such as magnetic connectors adapted for use in securing a pet leash to a pet collar.

Various types of magnetic connectors are known to the art. Chaffin U.S. Pat. No. 3,086,268 discloses a magnetic connector for securing a pet collar to a leash. The disclosed system includes a permanent magnet 44 that is secured to the pet collar and a ferromagnetic armature part 18 that is secured to the pet leash. The armature part includes a raised rim that receives the magnet. Budreck U.S. Pat. Nos. 3,009,225 and 3,041,697 and Geswelli U.S. Pat. No. 5,572,887 disclose other examples of magnetic connectors.

In spite of this previous work, a need presently exists for an improved magnetic connector that automatically aligns itself when the two parts of the connector are brought closely together, and that automatically mechanically interlocks the two parts of the connectors when tension is applied.

SUMMARY

By way of general introduction, the magnetic connector described below includes first and second connector parts that contain respective magnets. One of the connector parts includes an overhanging lip on one side of the respective magnet, and an attachment element such as a cord positioned on an opposed side of the respective magnet.

The magnets of this connector are oriented to automatically hold the first and second connector parts together with the first connector part disposed in a first position between the overhanging lip and the attachment element. The overhanging element is positioned such that a tensile force applied to the first connector part and resisted by the attachment element translates the first connector part from the first position to a second position, in which the first magnet is closer to the overhanging element and the first connector part is at least partially received under the overhanging lip, thereby mechanically interlocking the first and second connector parts.

The disclosed magnetic connector is well suited to releasably connect a pet leash to a pet collar. Tension on the pet leash automatically moves the first connector part to the second position, and thereby automatically mechanically interlocks the first and second connector parts.

The foregoing paragraphs have been provided by way of general introduction, and they are not intended to narrow the scope of the following claims.

BRIEF DESCRIPTION OF THE DRAWINGS

FIG. 4 is a cross-sectional view taken along line 4—4 of FIG. 2.

FIG. 5 is a cross-sectional view taken along line 5—5 of FIG. 3.

FIG. 6 is a cross-sectional view of a second embodiment.

DETAILED DESCRIPTION OF THE DRAWINGS

Figure 1:
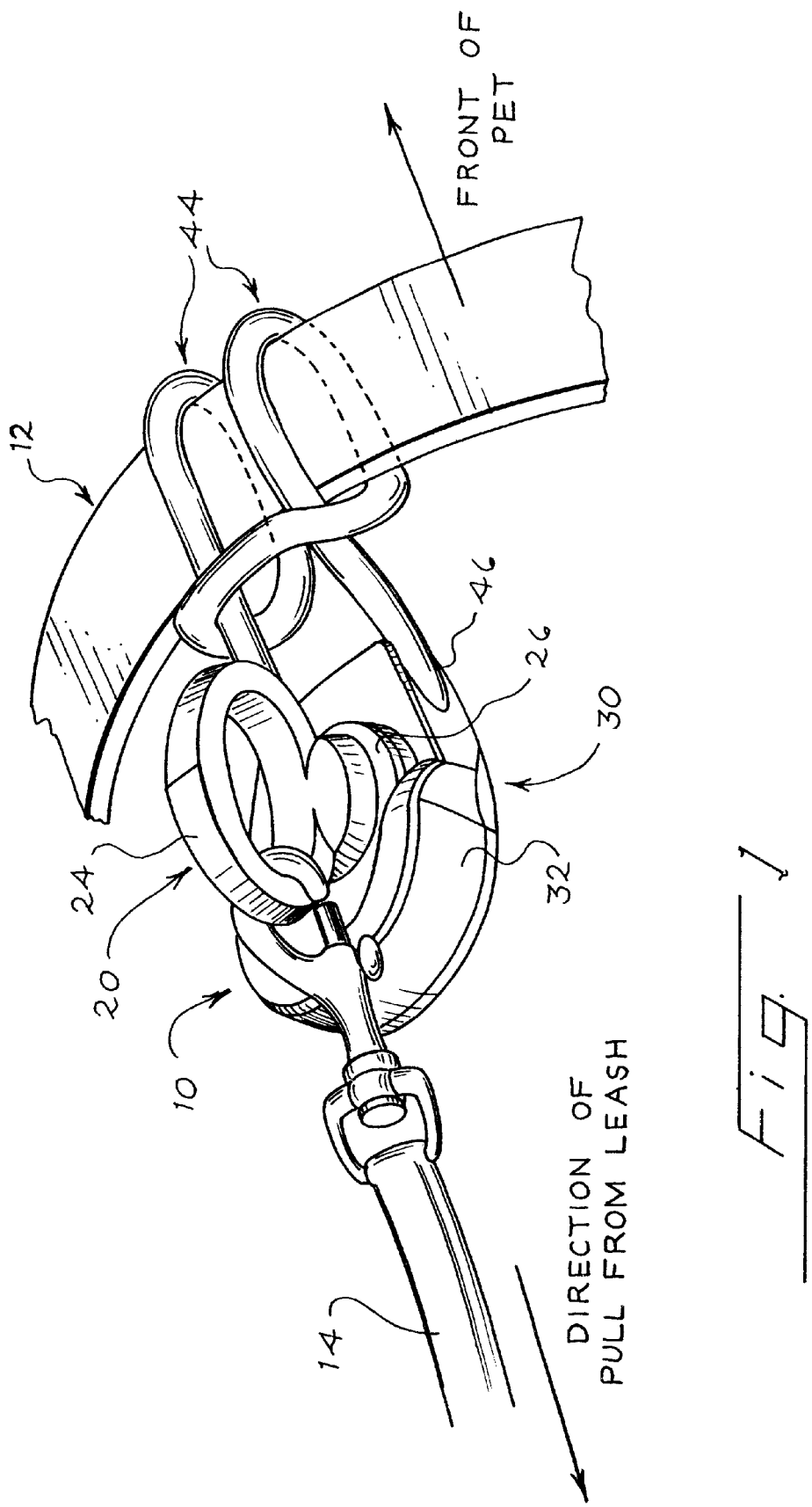
FIG. 1 is a perspective view of a magnetic connector that incorporates a preferred embodiment of this invention.

Turning now to the drawings, FIG. 1 shows a perspective view of a magnetic connector 10 interconnecting a pet collar 12 with a pet leash 14.

The connector 10 includes a first connector part 20 and a second connector part 30. In this example, the first connector part 20 is connected to the pet leash 14, and the second connector part 30 is connected to the pet collar 12, though the reverse arrangement is also possible.

As best shown in FIGS. 4 and 5, the first connector part 20 includes a disc-shaped permanent magnet 22 that is permanently mounted inside a generally circular body that supports a ring 24 and includes a circumferential flange 26. The pet leash 14 can be tied or clipped in any appropriate way to the ring 24 (FIG. 1). The lower surface of the first connector part 20 defines a generally flat sliding surface 28 (FIGS. 4 and 5).

As also shown in FIGS. 4 and 5, the second connector part 30 includes a base 32 and a cover 34. The base 32 defines an overhanging element 36 that in this embodiment takes the form of an arcuate overhanging lip 38 that defines an arcuate recess 40. The base 32 also forms a generally flat sliding surface 42.

Figure 2:
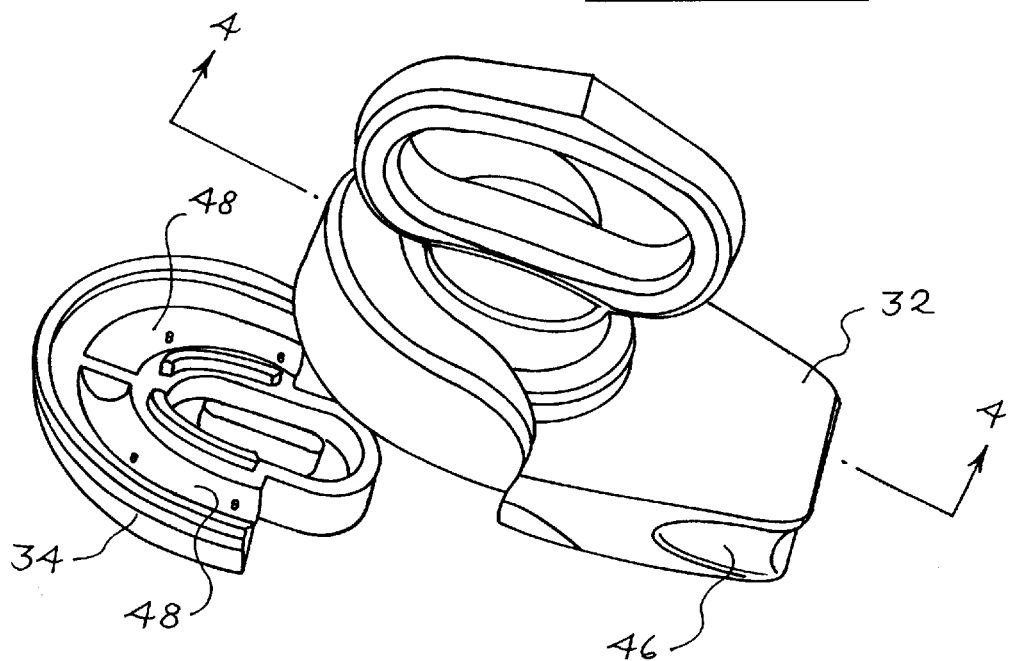
FIG. 2 is an exploded top perspective view of the connector of FIG. 1, showing the connector in the position of FIG. 1.
Figure 3:
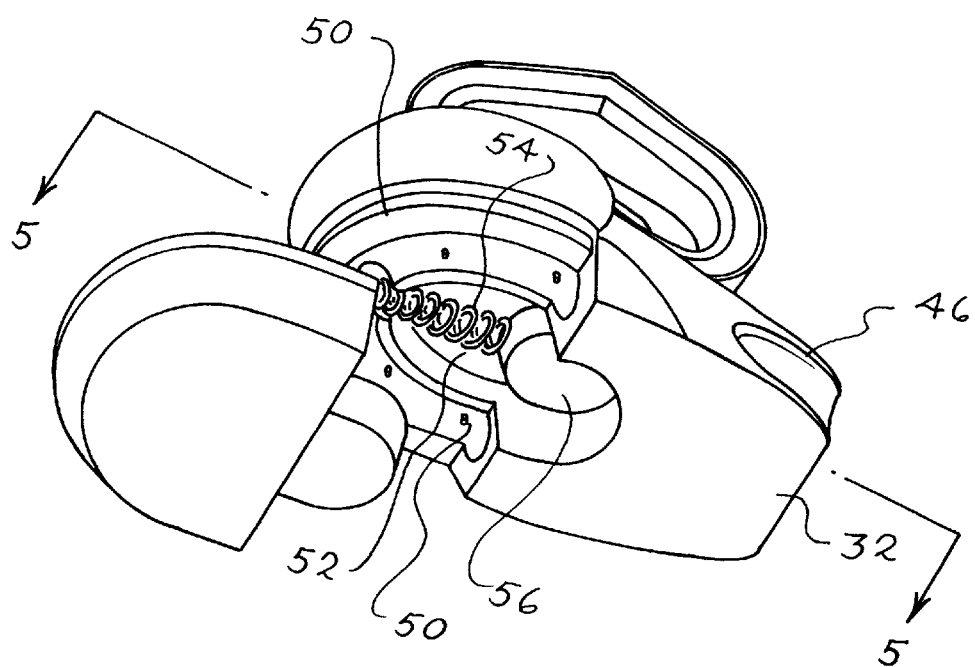
FIG. 3 is an exploded bottom perspective view of the connector of FIG. 1, showing the connector in an alternate position.

An attachment element such as a cord loop 44 is secured to the second connector part 30 (FIG. 1). In this example, the cord loop 44 extends through openings 46 in the base 32 and is received in recesses 48 in the cover 34 and recesses 50 in the base 32 (FIGS. 2 and 3). For example, the recesses 48, 50 can include protruding elements as shown that clamp against the cord loop 44.

As best shown in FIG. 3, the base 32 defines a guide 52 that in this example takes the form of an elongated slot. A second disc-shaped magnet 56 is mounted to slide within the guide 52, and the magnet 56 is biased away from the arcuate lip 38 to the position shown in FIG. 3 by a compression spring 54.

The second connector part 30 is assembled by placing the ends of the cord loop 44 in the recesses 50, placing the magnet 56 and the spring 54 in the guide 52, and then securing the cover 34 to the base 32, as for example with an adhesive or a sonic weld. Once assembled, the cover 34 holds the spring 54 and the magnet 56 in the guide 52, and the magnet 56 is free to slide along the axis of the guide 52 from a rest or first position (FIG. 5) to a second position (FIG. 4), in which the magnet 56 is positioned closer to the arcuate lip 38 and the spring 54 is compressed.

The connector 10 is used by first securing the first connector part 20 to the pet leash 14 and the second connector part 30 to the collar 12. For example, the cord loop 44 can be looped around the collar 12 as shown in FIG. 1, or the collar 12 can be threaded through the cord loop 44.

When it is desired to releasably connect the leash 14 to the collar 12, the first connector part 20 is simply brought into the vicinity of the second connector part 30. The magnets 22, 56 attract one another and automatically position the first connector part 20 in the first position shown in FIG. 5. Note that in this position the flange 26 is spaced away from the lip 38 and is not received in the recess 40. This facilitates automatic alignment. FIG. 5 shows the magnet 56 is in its rest position, with the spring 54 extended. In this first position, the magnetic attraction between the magnets 22, 56 holds the first and second connector parts 20, 30 together.

When tension is applied to the leash 14 during use, the first connector part 20 is caused to slide or translate from the first position of FIG. 5 to a second position as shown in FIGS. 1, 2 and 4. In this second position, the flange 26 moves under the arcuate lip 38 into the arcuate recess 40, as best shown in FIG. 4. As the first connector part 20 slides to the second position of FIG. 4, magnetic forces between the magnets 22, 56 slide the second magnet 56 away from its rest position, thereby compressing the spring 54, all as shown in FIG. 4. In this second position, the mechanical interlock between the arcuate lip 38 and the flange 26 holds the first and second connector parts 20, 30 together. The flexible cord loop 44 of FIG. 1 provides the advantage that it automatically aligns the second connector part 30 when tension is applied to the leash 40 in such a way that tensile forces applied by the leash 14 to the first connector part 20 move first connector part 20 from the first position of FIG. 5 to the second position of FIGS. 1, 2 and 4.

Preferably, the magnetic forces between the magnets 22, 56 are sufficiently large that friction between the sliding surfaces 28, 42 holds the first connector part 20 in the second position of FIGS. 1, 2 and 4 until the user pushes the first connector part 20 to the right (in the view of FIG. 4). In this way, the user can easily return the first connector part 20 to the first position shown in FIG. 5. Further sliding motion of the first connector part 20 (to the right as shown in FIG. 5) allows the first connector part 20 to readily be released from the second connector part 30.

Because the sliding surfaces 28, 42 in this example are substantially flat, the magnets 22, 56 automatically position the first connector part 20 in the first position of FIG. 5 in a reliable manner. The flat sliding surfaces 28, 42 readily accommodate the sliding, translating motion of the first connector part 20 between the first position of FIG. 5 and the second position of FIG. 4.

FIG. 6 shows a sectional view of an alternate embodiment, which is identical to embodiment of FIGS. 1–5, except that the spring has been deleted and replaced with a ferromagnetic element 60, which can take the form of a ball bearing. Magnetic attraction of the magnet 56 to the element 60 biases the magnet 56 to the position of FIG. 6, while allowing the magnet 56 to move in the guide 52 (to the left in the view of FIG. 6) to follow the magnet 22 as the A first component 20 moves toward the lip 38, all as described above.

The spring 54 of FIGS. 4 and 5 and the ferromagnetic element 60 of FIG. 6 are two examples of means for biasing the magnet 56 to a selected position in the guide 52. Other examples include a third magnet (in substitution for the element 60), or the force of gravity (when the second component 30 is normally oriented with one end of the guide 52 lower than the other). In some embodiments, a guide is provided for the second magnet, but no biasing means is required.

By way of example, the body of the first connector part 20, the base 32 and the cover 34 can be formed of any suitable thermoplastic material such as injection molded nylon or Delrin. The magnets can be neodymium magnets separated by about 0.020 inch in the first and second positions.

As used herein, the term "position" is intended broadly to encompass a range of positions, and the term "lip" includes overhanging elements of various shapes, widths, and lengths.

Of course, many changes and modifications can be made to the preferred embodiment described above. For example, the cord loop 44 can be replaced with another type of attachment element, such as a slotted plate, a ring, or a releasable connector. Also, in some embodiments the guide 52 and the spring 54 can be eliminated and the second magnet 56 can be fixedly mounted in the second connector part 30. In some cases, it may be desirable to include a mechanical snap-latch that releasably holds the first connector part 20 in the second position of FIG. 4 once the first connector part 20 has been moved to the second position by tension on the leash. The overhanging element 36 can take other forms, including overhanging elements of different shapes and geometries. In some cases the second connector part 30 can be formed without a separate cover.

The foregoing detailed description has discussed only a few of the many forms that this invention can take. For this reason, this detailed description is intended by way of illustration, and not by way of limitation. It is only the following the claims, including all equivalents, that are intended to define the scope of this invention.

What is claimed is:

1. A magnetic connector comprising:
a first connector part comprising a first magnet;
a second connector part comprising a second magnet, an overhanging element positioned to a first side of the second magnet, and an attachment element positioned to a second side of the second magnet, opposed to the first side;
said first and second magnets oriented to automatically hold the first and second connector parts together with the first connector part disposed in a first position between the overhanging element and the attachment element, wherein the first connector part is not received under the overhanging element when the first connector part is in the first position;
said overhanging element positioned such that a tensile force applied to the first connector part and resisted by the attachment element is operative to translate the first connector part from the first position to a second position, in which the first magnet is closer to the overhanging element and the first connector part is at least partially received under the overhanging element, thereby mechanically interlocking the first and second connector parts.

2. The invention of claim 1 wherein the first and second magnets are operative to hold the first connector part in the second position when the tensile forces are removed between the attachment element and the first connector part.

3. The invention of claim 1 wherein the attachment element comprises a cord.

4. The invention of claim 1 wherein the attachment element comprises a cord loop.

5. The invention of claim 1 wherein the first connector part is secured to a pet leash and the attachment element is secured to a pet collar.

6. The invention of claim 1 wherein one of a pet leash and a pet collar is secured to the first connector part, and wherein the other of the pet leash and the pet collar is secured to the attachment element.

7. The invention of claim 1 wherein the overhanging element comprises an arcuate element that extends partially around the first connector part when the first connector part is in the second position.

8. The invention of claim 1 wherein the overhanging element comprises a lip.

9. The invention of claim 1 wherein the first and second magnets comprise respective magnetic discs.

10. A magnetic connector comprising:
a first connector part comprising a first magnet;
a second connector part comprising a second magnet, an overhanging element positioned to a first side of the second magnet, a guide for the second magnet, and an attachment element positioned to a second side of the second magnet, opposed to the first side;

said first and second magnets oriented to automatically hold the first and second connector parts together with the first connector part disposed in a first position between the overhanging element and the attachment element;

said overhanging element positioned such that a tensile force applied to the first connector part and resisted by the attachment element is operative to translate the first connector part from the first position to a second position, in which the first magnet is closer to the overhanging element and the first connector part is at least partially received under the overhanging element, thereby mechanically interlocking the first and second connector parts.

11. The invention of claim 10 wherein the second connector part further comprises:

a spring coupled with the second magnet and biasing the second magnet in the guide away from the overhanging element.

12. The invention of claim 10 wherein the second connector part further comprises:

means for biasing the second magnet in the guide away from the overhanging element.

13. The invention of claim 10 wherein the second connector part further comprises:

a ferromagnetic element positioned such that magnetic forces between the second magnet and the ferromagnetic element bias the second magnet in the guide away from the overhanging element.

14. The invention of claim 1 wherein the first and second connector parts comprise respective first and second flat sliding surfaces positioned to contact one another between the first and second magnets when the first connector part is positioned in the first and second positions.

15. The invention of claim 14 wherein the first sliding surface slides and translates along the second sliding surface as the first connector part moves between the first and second positions.

16. The invention of claim 1 wherein said second magnet is moveably disposed in said second connector part.

17. The invention of claim 1 wherein said second magnet is fixedly mounted in said second connector part.

18. The invention of claim 1 wherein the attachment element comprises a first attachment element, and further comprising a second attachment element connected to said first connector part.

19. A method of connecting a first and second connector part comprising:

providing the first connector part, wherein the first connector part comprises a first magnet;

providing the second connector part, wherein the second connector part comprises a second magnet, an overhanging element positioned to a first side of the second magnet, and an attachment element positioned to a second side of the second magnet, opposed to the first side;

positioning the first connector part in a first position between the overhanging element and the attachment element, wherein the first connector part is not received under the overhanging element when the first connector part is in the first position;

holding the first connector part and the second connector part together in the first position with the first and second magnets; and applying a tensile force to at least one of the first and second connector parts while resisting the tensile force with the other of the first and second connector parts, and thereby translating the first connector part from the first position to a second position in which the first connector part is at least partially received under the overhanging element, thereby mechanically interlocking the first and second connector parts.

20. The invention of claim 19 wherein said overhanging element comprises an arcuate element that extends partially around the first connector part when the first connector part is in the second position, and wherein said applying the tensile force comprises applying the tensile force along a radial direction relative to the arcuate element.

21. The invention of claim 19 wherein said translating the first connector part from the first position to the second position comprises moving said second magnet with said first magnet from a third position to a fourth position.

22. The invention of claim 19 wherein the second magnet remains stationary relative to the second connector part as the first connector part is translated from the first position to the second position.

* * * * *